United States Patent [19]
Cushing

[11] 3,774,403
[45] Nov. 27, 1973

[54] SYSTEM FOR ROADBED TRAVERSING BY PIPELINE

[75] Inventor: Ralph H. Cushing, Omaha, Nebr.

[73] Assignee: Northern Natural Gas Company, Omaha, Nebr.

[22] Filed: Sept. 8, 1971

[21] Appl. No.: 178,644

[52] U.S. Cl. .................. 61/72.7, 61/16, 138/105, 138/149
[51] Int. Cl. .................. F16l 1/00, F16l 58/00
[58] Field of Search .................. 61/16, 72.1, 72.5, 61/72.7, 43; 138/149, 105; 175/62, 171

[56] References Cited
UNITED STATES PATENTS

| | | | |
|---|---|---|---|
| 3,254,012 | 5/1966 | Ziegler | 138/105 X |
| 2,896,669 | 7/1959 | Broadway et al. | 61/16 X |
| 3,559,660 | 2/1971 | Rollins | 138/149 |
| 1,210,187 | 12/1916 | Marquiss | 61/72.7 X |
| 2,924,245 | 2/1960 | Wilson | 138/149 |
| 3,492,029 | 1/1970 | French et al. | 138/149 X |

FOREIGN PATENTS OR APPLICATIONS 617,556  8/1935  Germany .................. 61/16

*Primary Examiner*—Jacob Shapiro
*Attorney*—Merriam, Marshall, Shapiro & Klose

[57] ABSTRACT

A casing pipe is extended laterally in a roadbed beneath the roadway, a pipeline smaller than the casing pipe is extended through the casing pipe and the space between the exterior surface of the pipeline and the interior surface of the casing pipe is filled with polymeric electrically nonconductive material.

8 Claims, 4 Drawing Figures

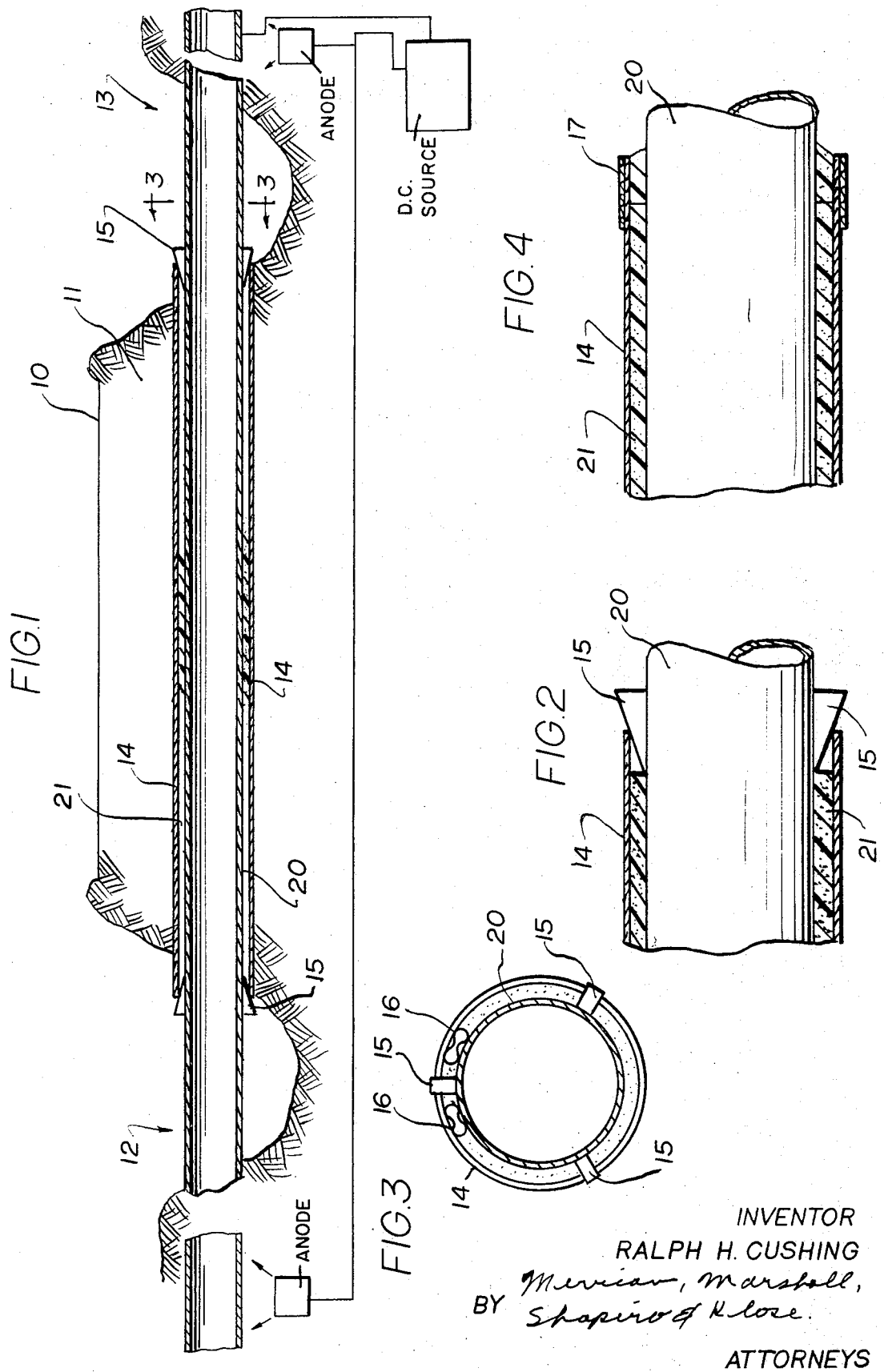
INVENTOR
RALPH H. CUSHING

SYSTEM FOR ROADBED TRAVERSING BY PIPELINE

This invention relates to pipelines used to convey a material from one location to another. More particularly, this invention is concerned with apparatus and methods for insulating a pipeline where it passes beneath a rise, such as a roadway, and is buried beneath the surface of the earth in a casing pipe.

Pipelines are widely used for the transmission of various fluid materials such as natural gas, water, oil, liquefied ammonia and other materials from one location to another. Normally the pipelines are buried in the ground a substantial depth beneath the earth surface. The pipelines are normally buried for safety but also for esthetic reasons as well as to protect the pipeline against inclement weather conditions.

When pipelines are laid, a trench or ditch is normally dug from the earth's surface to a depth at which the pipeline is to be buried in the ground. This procedure is entirely satisfactory in open-spaced areas, such as when the pipeline passes through crop land or grazing land or in other areas where the existence of a trench during the pipeline laying operation can be tolerated without significant interference to human activity in the area. There are many areas, however, where it is not appropriate to dig a trench because it would obstruct human activity and cause great inconvenience until the pipeline is buried and the trench is filled. This is particularly so where the pipeline must cut through a roadbed used for a railroad or as a street or highway. Not only would a pipeline trench across a roadway disrupt traffic, but it would be an unsafe condition. Therefore, it is conventional for a pipeline to be installed beneath a roadway by a means which avoids blocking or obstructing the roadway by a trench.

Normally a pipeline is installed beneath a roadway by first installing in the roadbed a suitable casing pipe in horizontal position substantially lateral or normal to the roadway and then positioning a pipeline in the casing pipe. Since the casing pipe must be somewhat larger than the pipeline for this system to be employed, and because the casing pipe is positioned at a level which permits water to enter the space between the casing pipe and the pipeline, a condition is created which facilitates the inducement of corrosion in the pipeline as well as in the casing pipe. The possibility of corrosion is further enhanced because it is normal to employ cathodic protection on a pipeline. The electric current employed for the cathodic protection can readily short across the pipeline and casing pipe to the earth and thereby further enhance conditions which lead to corrosion. Therefore, there is an existing need for improved means and methods for insulating pipelines in casing pipes when the pipeline travels through a roadway.

There is provided according to the subject invention the combination of a roadway having a solid roadbed, a casing pipe extending about horizontally and laterally beneath the roadway in the roadbed, a pipeline smaller than the casing pipe extending through the casing pipe and polymeric electrically nonconductive material filling the space between the exterior surface of the pipeline and the interior surface of the casing pipe. The polymeric material prevents flow of electrical current between the pipeline and the casing pipe and thus prevents or restricts corrosion. In addition, the polymeric material prevents water from settling in, or flowing to, the space between the pipeline and the casing pipe and thereby further protects the pipeline against corrosion.

The invention will now be described further in conjunction with the attached drawings in which:

FIG. 1 is an elevational view, partially in section, showing a pipeline positioned in a casing pipe passing beneath a roadway;

FIG. 2 is an enlarged view of an end of the casing pipe in FIG. 1 and shows spacing wedges for centering the pipeline;

FIG. 3 is a vertical sectional view taken along the line 3—3 of FIG. 1; and

FIG. 4 is an elevational view, partially in section, showing one end of the casing pipe with a collar extension thereon with polymeric material between it and the pipeline.

So far as is practical, the same elements or parts which appear in the various figures of the drawings will be identified by the same numbers.

With reference to FIG. 1, roadway 10 is located on top of, and is supported by, a solid roadbed 11 which has a pipeline construction ditch 12 along one side and a pipeline construction ditch 13 along the other side. Ditches 12 and 13 are normally dug considerably deeper than the drainage ditches used to receive water to keep the roadway dry and above the surface of any water which may accumulate after a spring thaw or a heavy rain. After the pipeline is installed, ditches 12 and 13 are filled in and generally are contoured to the slope and level of the water drainage ditches. Casing pipe 14 is placed essentially horizontal in the roadbed and extends the full width of the roadbed and slightly therebeyond. Casing pipe 14 is normally placed substantially lateral or normal to the roadway in order for the casing pipe to pass through the roadbed in the shortest distance. Casing pipe 14 can be positioned in the roadbed by conventional means including first drilling a hole through the roadbed and thereafter sliding the casing pipe 14 through the hole. Alternatively, the casing pipe 14 can be driven through the roadbed by suitable driving means with one end of the casing pipe 14 being equipped with a pointed nose to facilitate the driving operation. After the casing pipe 14 is properly positioned, the pointed nose can be removed.

When the casing pipe has been suitably positioned in the roadbed, the pipeline 20 can be slid through and suitably positioned. The exterior dimension of the pipeline is less than the interior dimension of the pipe casing to thereby provide a space or clearance 21 between the two pipes. The pipeline is centered with respect to the casing pipe by suitable centering means, such as by wooden wedges 15 as shown in FIGS. 1 to 3. If desired, additional or alternative spacing means can be used. Thus, as shown in FIG. 3, spacers 16, which can be made of suitable elastomeric material, such as polyurethane, can be positioned periodically throughout the length of the space 21 between the casing pipe and the pipeline 20 to further aid in centering the pipes with respect to each other and to keep the pipes centered throughout the length of the casing pipe in case of sagging or bowing of the casing pipe.

After the casing pipe 14 and the pipeline 20 have been positioned with respect to one another, a suitable polymeric electrically nonconductive material is positioned in the space between the two pipes. Generally, it is advisable to employ a polymeric material which can be foamed-in-place in the space between the two pipes to thereby fully occupy the space 21 and thus bar the flow of water or air into and around the pipeline. A number of foamed polymeric materials can be used but it is presently considered that the most suitable material is foamed-in-place polyurethane foam. Any readily available materials can be used for this purpose as well as conventional foaming equipment. A nozzle ring on the end of a long handle can be used to deposit foamed-in-place polyurethane foam starting at one end of the casing and continuing to the other end with uniform withdrawal of the nozzle. The type of foam composition employed should be one which is of the tough rigid type in order to prevent the pipeline from compressing the polymeric material by its weight or through earth shifting and settling.

After the interior space 21 between the pipeline 20 and the casing pipe 14 has been filled with polymeric material up to close by wedges 15, the wedges can be removed and a collar 17 slid over the outer end surface of the casing pipe. The application of polymeric material can then continue until the entire space 21 between the casing pipe and the pipeline is filled and the polymeric material further extended outwardly beyond the end of the casing pipe by placing polymeric material in the space between the sleeve or collar 17 and the pipeline 20.

The embodiment of the invention as illustrated by FIGS. 1 to 4 of the drawings shows the ends of the casing pipe 14 terminated in construction ditches 12 and 13 which are generally below normal water level. After filling ditches 12 and 13 the ends of the casing will be in moist or damp earth.

The cathodic protection system used for the protection of the pipeline, although positioned at remote locations along the length of the pipeline, is specifically illustrated by the drawing.

It is also within the scope of the invention to employ a casing pipe which has been prelined with a suitable polymeric electrically nonconductive material and to first position such a casing pipe beneath the roadway and to thereafter insert the pipeline therein thus avoiding the necessity of placing the polymeric material in position after the pipeline is inserted in the casing pipe.

It is also within the scope of the invention to employ a precased pipe and casing with polymeric electrically nonconductive material in place and to insert the pipe and casing under the roadway using hydraulic or sonic driving devices or by excavation and backfilling.

The foregoing detailed desciption has been given for clearness of understanding only, and no unnecessary limitations should be understood therefrom as modifications will be obvious to those skilled in the art.

What is claimed is:

1. In combination:
   a roadway having a solid roadbed;
   a water-tight casing pipe extending laterally beneath the roadway in the roadbed;
   a pipeline smaller than the casing pipe extending through the casing pipe;
   a cathodic protection system connected to said pipeline; and
   polymeric electrically nonconductive material filling the space between the exterior surface of the pipeline and the interior surface of the casing pipe.

2. A combination according to claim 1 in which the casing pipe and the pipeline are metal.

3. A combination according to claim 1 in which each side of the roadway has a ditch and the casing pipe extends from one ditch to the other.

4. A combination according to claim 1 in which the polymeric material is a foamed-in-place material.

5. The method which comprises:
   installing a water-tight casing pipe horizontally beneath a roadway on a roadbed,
   installing a pipeline in the casing pipe with clearance between the pipeline and the casing pipe,
   centering the pipeline in the casing pipe by means of spacers,
   applying a cathodic protection system to the pipeline, and
   applying a polymeric electrically nonconductive material in the space between the pipeline and the casing pipe.

6. The method of claim 5 in which the polymeric material is foamed-in-place.

7. The method of claim 5 in which the casing pipe and pipeline are metal.

8. The method of claim 5 in which the casing pipe ends terminate at ditches on each side of the road-bed.

* * * * *